(No Model.)
M. W. DEWEY.
METHOD OF AND APPARATUS FOR ELECTRICALLY SUPPLYING HOT WATER FOR CONSUMPTION AND HEATING PURPOSES.
No. 451,240. Patented Apr. 28, 1891.
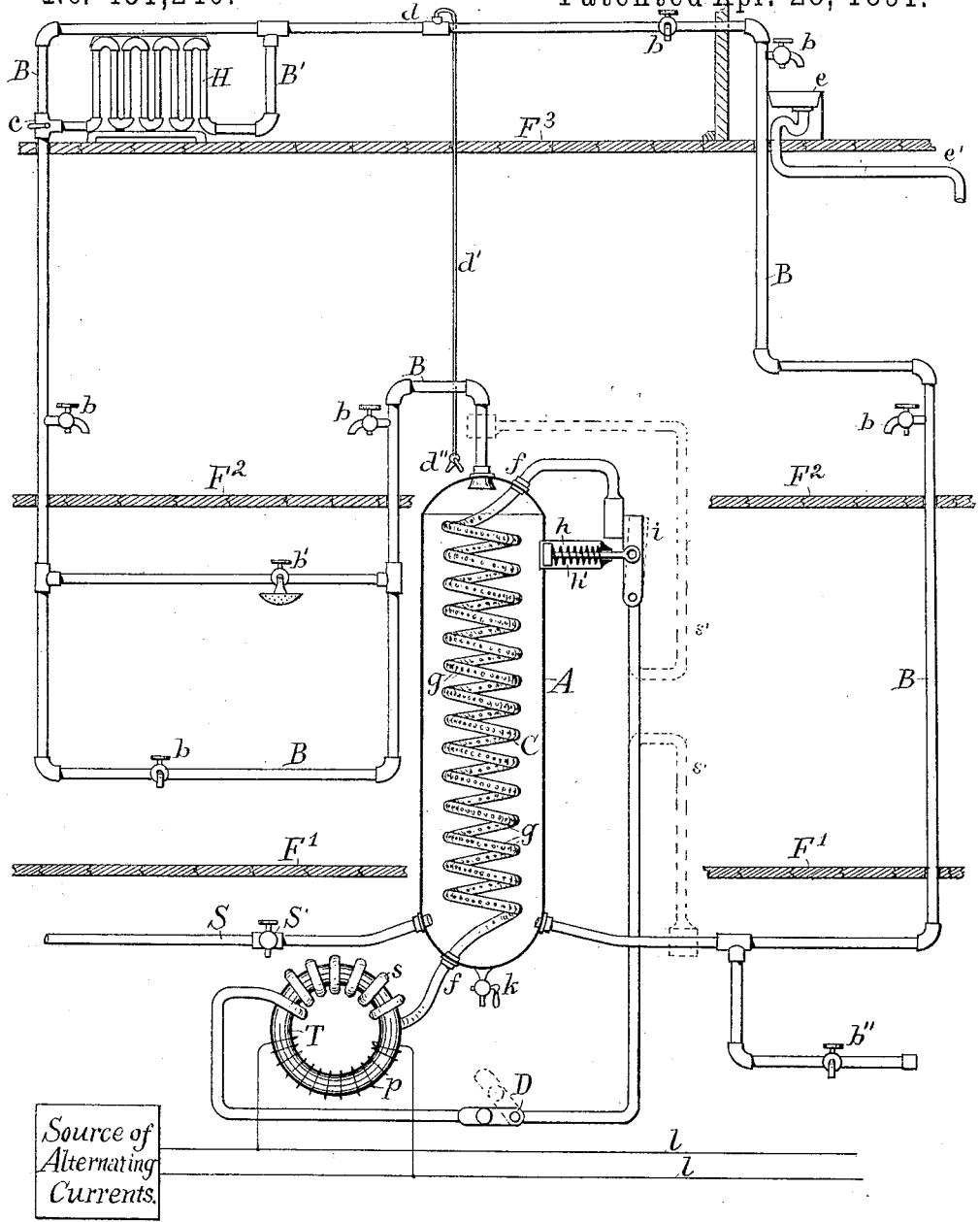
WITNESSES:
J. J. Laass
A. F. Walz
INVENTOR:
Mark W. Dewey,
BY
Duell, Laass & Duell
his ATTORNEYS.

United States Patent Office.

MARK W. DEWEY, OF SYRACUSE, NEW YORK, ASSIGNOR TO THE DEWEY CORPORATION, OF SAME PLACE.

METHOD OF AND APPARATUS FOR ELECTRICALLY SUPPLYING HOT WATER FOR CONSUMPTION AND HEATING PURPOSES.

SPECIFICATION forming part of Letters Patent No. 451,240, dated April 28, 1891.

Original application filed April 5, 1890, Serial No. 346,704. Divided and this application filed January 12, 1891. Serial No. 377,484. (No model.)

*To all whom it may concern:*

Be it known that I, MARK W. DEWEY, of Syracuse, in the county of Onondaga, in the State of New York, have invented new and useful Improvements in the Method of and Apparatus for Electrically Supplying Hot Water for Consumption and Heating Purposes, (Case No. 82,) of which the following, taken in connection with the accompanying drawing, is a full, clear, and exact description.

My invention relates to a new and improved method of and apparatus for supplying hot water for consumption purposes or for changing temperature in desired localities, and is similar in some respects to my method set forth in United States Letters Patent issued February 4, 1890, No. 420,641.

This invention is a division of my application, Serial No. 346,704, filed April 5, 1890.

The objects of this my present invention are to distribute water in a pipe heated by electricity to or through one or more localities, whereat the water may be released from the pipe or utilized for heating purposes; to maintain a continuous circulation of the water in the distributing-pipe; to keep the water at a uniform temperature; to make the said distributing-pipe or a portion thereof part of the electric circuit and the heating-conductor, and, further, to automatically regulate the said electric current to maintain the water at a constant temperature by the pressure or expansion and contraction of the water due to the heating and cooling of the same.

My invention is particularly designed for use in buildings having various apartments to be constantly supplied with hot water for consumption purposes and where the hot water may be released or drawn from the distributing-pipes, but may also be employed for heating purposes, as when the water is circulated through a radiator or coil.

My invention consists, collectively, in filling a reservoir and a circulating-pipe extending therefrom with water, allowing the escape of air from the highest part of the pipe while the reservoir and pipe are being filled, subjecting the water contained in the reservoir and pipe to the heating effect produced by an electric current in a part of an electric circuit composed partly of said pipe, simultaneously therewith circulating said water in the pipe leading from and to the reservoir and through one or more remote localities, whereat the water may be released or drawn from the pipe or utilized for heating purposes, supplying the reservoir and pipe with water while it is released, and automatically regulating the electric heating-current by the variations of pressure or the expansion and contraction of the water in said reservoir due to the heating and cooling of the water.

My invention consists, also, in circulating water through an electrically-heated pipe, forming part of an electric circuit and extending to one or more localities, whereat the water may be released or utilized for heating purposes.

The accompanying drawing is a diagrammatic view of my apparatus for supplying hot water, and shows circulating-pipes leading from and to a boiler supplied with water and through rooms or apartments, and shows also means for electrically heating the water and automatically controlling its temperature.

Referring to the drawing, A represents a section of the reservoir or boiler.

B is the circulating or distributing pipe leading from the top or upper part of the reservoir to and through different localities, which are shown as apartments or rooms in a house, and returning to the lower part of said reservoir.

F', F², and F³ indicate a sectional view of the floors of the house. *b b b*, &c., represent the faucets of the pipe located in the various rooms, to release the water from said pipe, and H is a radiator for heating one or more rooms on floor F³ and in a branch pipe B', and is provided with a two-way cock *c* at the junction of the branch pipe with the main pipe B, so that the hot water may be circulated through the radiator or around the latter through the main pipe, as desired, without cutting off the supply of water to the other apartments or stopping the circulation of water in the pipe.

*b'* represents a faucet in a branch pipe, through which the hot water is constantly circulated, and $b''$ shows a faucet in a branch pipe extending from the main pipe B, and through which the water is not circulated, except when the faucet is opened.

In order to allow the escape of air from the reservoir A and pipes B and B' when the reservoir and pipes are being filled with water by the supply-pipe S, which connects the reservoir with a suitable head of water, I provide an air-outlet in the main pipe, preferably at the top or highest point reached by said pipe, and for convenience, or so that this air-outlet $d$ may be easily controlled, I extend a small pipe $d'$ from the outlet directly to or near the reservoir or boiler A, and provide the end of the latter pipe with an air-faucet $d''$.

$e$ indicates a sink under one of the faucets $b$, and $e'$ is a waste-water pipe extending therefrom.

Any suitable source of electricity may be employed for heating the water; but I preferably employ a secondary electric generator or inductional transformer T, having its primary coil $p$ connected in parallel with leads $l\,l$, extending from a source of alternating currents. The secondary coil $s$ of said transformer is preferably formed of a copper rod or cable to obtain good conductivity and its terminals $f\,f$ connected with a coiled iron pipe C, containing perforations $g$ and extending through the interior of the boiler A. The said pipe C is of higher resistance than the conductor forming the coil $s$ and constitutes the heating-conductor for the boiler A. The perforations allow the water to circulate within said pipe C, and the surface area of the pipe in contact with the water in the boiler is thereby greatly increased, rendering the apparatus very efficient.

To automatically control the heating-current and the heating of the water in the boiler or reservoir A, I provide a pressure-cylinder $h$, having its open end protruding into the boiler near its upper part. A pivoted circuit maker and breaker $i$ in one of the electric connections of the coil $s$ is attached to the outer end of the spring-actuated piston-rod $h'$, and is adapted to close the circuit through the heating-conductor C when the pressure or heat of the water in the boiler is not too great, and to open the said circuit when the pressure or heat does become too great, and to maintain either condition after a change is effected until an opposite change takes place. For instance, when the boiler A is cool there is not enough pressure in the boiler to actuate the piston-rod $h'$ against the pressure of its spring, and the circuit-breaker $i$ remains closed; but in this condition, if the water is not drawn off rapidly enough from the pipe B in the various apartments, the electrically-heated pipe C soon raises the water to a high temperature—that is, higher than is necessary or desirable—presses the piston-rod $h'$ outward from the cylinder $h$, and moves the circuit-breaking lever $i$ to open the circuit, as shown in dotted lines in the drawing, which allows the water to cool, and consequently the decrease of pressure of the same in the boiler upon the piston-rod $h'$, which in turn again closes the circuit.

In some cases, in order to keep the water in the pipe B highly and more uniformly heated, I include all or a portion of said pipe also in the heating-circuit, as indicated by the dotted connections $s'\,s'$, and construct said pipe also so that it will offer sufficient resistance to the electric current and become heated, and thus assist the pipe C within the boiler in heating the water.

It will be obvious that when the pipe B is included in the heating-circuit and electrically heated it will be possible in some cases to dispense with the boiler A and its coiled pipe C.

On account of the low pressure or electro-motive force of the electric current employed, the latter is not apt to leave its metallic conductor and pass through the water in the boiler; but, should it be deemed desirable, the heating conductors or pipes may be coated within or without, or both, with some suitable insulating paint or enamel that will not appreciably obstruct the heat.

The supply-pipe S is provided with a cock S' to shut off the supply of water to the boiler A, and the said boiler is provided with a faucet $k$ at its lower end.

When it is not desirable to heat the water for distribution, the heating-circuit may be opened and the supply of electric current cut off by opening the switch D, as indicated in dotted lines in the drawing.

I do not limit myself to a water-heating system for isolated plants, as the source of electricity may be located at a central station at a distance and supply electricity to many localities and for various purposes.

Any matters set out in this application and not claimed concerning electrically heating the water in the boiler and circulating or distributing the same are not dedicated to the public, but form the subject-matter of my application, of which this is a division.

Having described my invention, what I claim as new, and desire to secure by Letters Patent, is—

1. The method of supplying hot water for consumption or heating purposes, consisting in subjecting water contained in a pipe to a heating effect produced by an electric current in a portion of an electric circuit composed of said pipe and circulating the water in the pipe leading to and through one or more localities, whereat the water may be released from the pipe or utilized for heating purposes.

2. The method of supplying hot water for consumption purposes, consisting in subjecting water contained in a pipe and under pressure to a heating effect produced by an electric current in a portion of an electric circuit composed of said pipe, circulating the water in the pipe leading to and through one or more localities, whereat the water may be released from the pipe, and supplying the pipe with water at a certain point while it is released at said locality or localities.

3. The method of supplying hot water for consumption or heating purposes, consisting in subjecting water contained in a pipe to a heating effect produced by an electric current in a portion of an electric circuit composed of said pipe and circulating the water in the pipe leading to and through one or more localities, whereat the water may be released from the pipe or utilized for heating purposes, and controlling the electric current flowing in the pipe by the variation in pressure of the heated water to maintain the water at a constant temperature.

4. The herein-described method of electrically heating water for consumption purposes, which consists in circulating water through a distributing-pipe and passing an electric heating-current through said pipe or a portion thereof to maintain the pipe in a heated condition.

5. The method of supplying hot water for consumption or heating purposes, consisting in subjecting water contained in a pipe to a heating effect produced by an electric current in a portion of an electric circuit composed of said pipe and circulating the water in the pipe leading to and through one or more localities, whereat the water may be released from the pipe or utilized for heating purposes, and interrupting the electric current when the pressure of the water becomes higher than desired and passing the current when the pressure of the water is lower than desired.

6. In a system for supplying hot water for consumption or heating purposes, a suitable source of electricity, a distributing-pipe containing water and leading to one or more localities, where it may be released from the pipe, and electric conductors connecting a portion of the pipe in circuit with the source.

7. In a system for supplying hot water for consumption or heating purposes, a suitable source of electricity, a distributing-pipe containing water and leading to one or more localities, a supply-pipe, and electric conductors connecting a portion of the distributing-pipe in circuit with the source, for the purpose described.

8. In a system for supplying hot water for consumption or heating purposes, a suitable source of electricity, a distributing-pipe containing water and leading to one or more localities, a supply-pipe, and electric conductors connecting a portion of the distributing-pipe in circuit with the source, and an automatic electric-current controller in circuit with the source of electricity and operated by the expansion and contraction due to the heating and cooling of the water, for the purpose described.

9. In a system for supplying hot water for consumption or heating purposes, a suitable source of electricity, a distributing-pipe containing water and leading to one or more localities, a supply-pipe, and electric conductors connecting a portion of the distributing-pipe in circuit with the source, and means for releasing the water from the distributing-pipe at said localities when desired.

10. In a system for supplying hot water for consumption or heating purposes, a suitable source of electricity, a distributing-pipe containing water and leading to one or more localities, a supply-pipe, and electric conductors connecting a portion of the distributing-pipe in circuit with the source, and an automatic electric-current controller in circuit to interrupt the current when the pressure of the water is too high and to pass the current when the pressure is too low.

In testimony whereof I have hereunto signed my name this 10th day of January, 1891.

MARK W. DEWEY. [L. S.]

Witnesses:
C. H. DUELL,
C. L. BENDIXON.